United States Patent

Suh et al.

(10) Patent No.: US 10,862,637 B2
(45) Date of Patent: Dec. 8, 2020

(54) SEGMENT BASED REFERENCE SIGNAL

(71) Applicant: Huawei Technologies Co., Ltd., Shenzhen (CN)

(72) Inventors: Jung Hoon Suh, Kanata (CA); Alireza Bayesteh, Ottawa (CA); Osama Aboul-Magd, Kanata (CA); Kwok Shum Au, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 16/184,002

(22) Filed: Nov. 8, 2018

(65) Prior Publication Data

US 2020/0153571 A1 May 14, 2020

(51) Int. Cl.
*H04L 5/00* (2006.01)
*H04L 27/26* (2006.01)
*H04W 84/12* (2009.01)

(52) U.S. Cl.
CPC .......... *H04L 5/0026* (2013.01); *H04L 5/0044* (2013.01); *H04L 5/0048* (2013.01); *H04L 27/2613* (2013.01); *H04L 27/261* (2013.01); *H04W 84/12* (2013.01)

(58) Field of Classification Search
CPC . H04L 27/2613; H04L 5/0048; H04L 5/0044; H04L 27/261; H04L 5/0026; H04W 84/12
USPC ........................................................ 370/330
See application file for complete search history.

(56) References Cited

U.S. PATENT DOCUMENTS

| | | | | |
|---|---|---|---|---|
| 2011/0026623 | A1* | 2/2011 | Srinivasa | H04L 27/2608 375/260 |
| 2011/0305296 | A1* | 12/2011 | Van Nee | H04L 5/0053 375/295 |
| 2013/0315163 | A1 | 11/2013 | Zhang et al. | |
| 2015/0010098 | A1* | 1/2015 | Kenney | H04B 7/0697 375/267 |
| 2015/0195112 | A1 | 7/2015 | Jones, IV et al. | |
| 2015/0365203 | A1 | 12/2015 | Suh et al. | |
| 2016/0029397 | A1* | 1/2016 | Chen | H04L 1/0057 370/329 |

(Continued)

FOREIGN PATENT DOCUMENTS

CN 102835061 A 12/2012

OTHER PUBLICATIONS

Taherzadeh, M., et al., "SCMA Codebook Design", IEEE 80th Vehicular Technology Conference, Sep. 2014, 5 pages, Vancouver, BC, Canada.

*Primary Examiner* — Rownak Islam
(74) *Attorney, Agent, or Firm* — Slater Matsil, LLP (57) ABSTRACT

In accordance with embodiments, methods and systems for data transmissions are disclosed. A station (STA) transmits an orthogonal frequency division multiplexing (OFDM) frame to an access point (AP). The OFDM frame comprises an OFDM symbol. The OFDM symbol comprises data tones and pilot tones. The total number of the data tones and the pilot tones in the OFDM symbol is divisible by 4. In some embodiments, the OFDM symbol may comprises 232 data tones, 8 pilot tones, 5 direct current (DC) tones, and 11 edge tones. The 232 data tones and 8 pilot tones of the OFDM symbol may be segmented to a set of 15 blocks for channel estimation between the AP and the STA.

19 Claims, 8 Drawing Sheets

(56) References Cited

U.S. PATENT DOCUMENTS

| | | | |
|---|---|---|---|
| 2016/0192351 A1* | 6/2016 | Kwon | H04W 72/0413 |
| | | | 370/329 |
| 2016/0211867 A1* | 7/2016 | Guillemette | H03M 13/1114 |
| 2017/0041948 A1* | 2/2017 | Cheng | H04L 5/0051 |
| 2017/0310504 A1* | 10/2017 | Srinivasa | H04L 1/0693 |
| 2020/0076552 A1* | 3/2020 | Cherian | H04L 5/0037 |

* cited by examiner

| | 602 | 604 | 606 | 608 | 610 | 612 |
|---|---|---|---|---|---|---|
| | $H_{15}$ | $H_{14}$ | $H_{13}$ | $H_{12}$ | $H_{11}$ | $H_{10}$ |
| | $H_{14}$ | $H_{13}$ | $H_{12}$ | $H_{11}$ | $H_{10}$ | $H_9$ |
| | $H_{13}$ | $H_{12}$ | $H_{11}$ | $H_{10}$ | $H_9$ | $H_8$ |
| | $H_{12}$ | $H_{11}$ | $H_{10}$ | $H_9$ | $H_8$ | $H_7$ |
| | $H_{11}$ | $H_{10}$ | $H_9$ | $H_8$ | $H_7$ | $H_6$ |
| | $H_{10}$ | $H_9$ | $H_8$ | $H_7$ | $H_6$ | $H_5$ |
| | $H_9$ | $H_8$ | $H_7$ | $H_6$ | $H_5$ | $H_4$ |
| | $H_8$ | $H_7$ | $H_6$ | $H_5$ | $H_4$ | $H_3$ |
| | $H_7$ | $H_6$ | $H_5$ | $H_4$ | $H_3$ | $H_2$ |
| | $H_6$ | $H_5$ | $H_4$ | $H_3$ | $H_2$ | $H_1$ |
| | $H_5$ | $H_4$ | $H_3$ | $H_2$ | $H_1$ | $H_{16}$ |
| | $H_4$ | $H_3$ | $H_2$ | $H_1$ | $H_{16}$ | $H_{15}$ |
| | $H_3$ | $H_2$ | $H_1$ | $H_{16}$ | $H_{15}$ | $H_{14}$ |
| | $H_2$ | $H_1$ | $H_{16}$ | $H_{15}$ | $H_{14}$ | $H_{13}$ |
| | $H_1$ | $H_{16}$ | $H_{15}$ | $H_{14}$ | $H_{13}$ | $H_{12}$ |
| | STA 1 | STA 2 | STA 3 | STA 4 | STA 5 | STA 6 |

SEGMENT BASED REFERENCE SIGNAL

TECHNICAL FIELD

The present invention relates to a system and method for wireless communications, and, in particular embodiments, to a system and method for multiple access in wireless local area networks.

BACKGROUND

Next generation Wireless Local Area. Networks (WLANs) will be deployed in high-density environments that include multiple access points providing wireless access to large numbers of mobile stations in the same geographical area. Institute of Electrical and Electronics Engineers (IEEE) 802.11ax is being developed to address these challenges, and is expected to provide up to four times the throughput of IEEE 802.11ac networks.

Multiple access is a function of wireless communications systems in which multiple user devices can share resources. Multiple access systems may be orthogonal or non-orthogonal. In orthogonal multiple access systems, signals for different user devices are transmitted on different physical channel resources (e.g., time, frequency, or some combination). In non-orthogonal multiple access (NoMA) systems, such as sparse code multiple access (SCMA) based systems, there may be cross-correlation of signals for different user devices.

NoMA technology such as SCMA can be desired. However, there are technical challenges for adopting the NoMA (e.g., SCMA) technology in WLAN systems. Accordingly, there is a need to design a new numerology for orthogonal frequency division multiplexing (OFDM) to better accommodate the NoMA (e.g., SCMA) technology for improving the performance and resource utilization of WLAN devices. Based on the new OFDM numerology, it is also desirable to re-design the frame format and the reference signal (RS) format for channel estimation to better adopt the SCMA technology.

SUMMARY OF THE INVENTION

Technical advantages are generally achieved by embodiments of this disclosure which describe systems and methods for communicating data in a non-orthogonal multiple access (NoMA) WLAN wireless network.

In accordance with embodiments, methods and systems for data transmissions are disclosed. The AP receives, from a station (STA), an orthogonal frequency division multiplexing (OFDM) frame. A first set of allocated tones for transmitting an OFDM symbol in the OFDM frame comprises data tones and pilot tones. The total number of the data tones and the pilot tones in the OFDM symbol is divisible by 4. In some embodiments, the total number of the data tones and the pilot tones in the OFDM symbol is divisible by 16. In some embodiments, the first set of allocated tones may comprise 232 data tones and 8 pilot tones. The allocated tones may further comprise 5 direct current (DC) tones and 11 edge tones. The OFDM frame may comprise an Extreme High Throughput (EHT) channel estimation signal (EHT-CES) including the OFDM symbol for channel estimation between the AP and the STA. The OFDM frame may further comprise a data field and one of an Extreme High Throughput (EHT) short training field (EHT-STF), or an EHT SIG field (EHT-SIG).

The OFDM symbol may comprise a first reference signal (RS) transmitted by the data tones and the pilot tones of the first set of allocated tones. The data tones and the pilot tones of the first allocated tones may be segmented into a plurality of blocks for channel estimation between the AP and the STA.

The AP decodes the OFDM symbol using a codebook. The codewords of the codebook are applied every 4 or every multiple of 4 tones.

The AP may receive, from a second STA, a second OFDM frame. A second OFDM symbol in the second OFDM frame may comprise a second RS transmitted by data tones and pilot tones of a second set of allocated tones. The second set of allocated tones may be segmented into a second plurality of blocks for channel estimation between the AP and the second STA. Each block of the plurality of blocks for transmitting the first RS may be orthogonal to a corresponding block of the second plurality of blocks for transmitting the second RS.

In some embodiments, the OFDM symbol may comprise a first reference signal (RS) transmitted by the 232 data tones and the 8 pilot tones of the first set of allocated tones. The 232 data tones and the 8 pilot tones of the first set of allocated tones may be segmented into a set of 15 blocks for channel estimation between the AP and the STA. The AP may receive the second OFDM frame. The second OFDM symbol in the second OFDM frame may comprise the second RS transmitted by 232 data tones and 8 pilot tones of a second set of allocated tones. The 232 data tones and the 8 pilot tones of the second set of allocated tones may be segmented into a second set of 15 blocks for channel estimation between the AP and the second STA. The number of tones in each block of the set of 15 blocks for transmitting the first RS and the second set of 15 blocks for transmitting the second RS may equal 16. Each block of the 15 blocks for transmitting the first RS may be orthogonal to a corresponding block of the second set of 15 blocks for transmitting the second RS. The first RS may be different from the second RS.

In one embodiment, each block of the set of 15 blocks transmitting the first RS and the second set of 15 blocks for transmitting the second RS may comprise a Hadamard code of a set of 16 orthogonal Hadamard codes.

In accordance with embodiments, a STA generates an orthogonal frequency division multiplexing (OFDM) symbol in an OFDM frame based on a codebook. The codewords of the codebook are applied every 4 or every multiple of 4 tones. The STA transmits, to an access point (AP), the OFDM frame. A first set of allocated tones for transmitting an OFDM symbol in the OFDM frame may comprise data tones and pilot tones. The total number of the data tones and the pilot tones in the first set of allocated tones may be divisible by 4. In some embodiments, the total number of the data tones and the pilot tones in the first set of allocated tones is divisible by 16. In some embodiments, the first set of allocated tones may comprise 232 data tones and 8 pilot tones. The first set of allocated tones may further comprise 5 direct current (DC) tones and 11 edge tones. The OFDM frame may comprise an Extreme High Throughput (EHT) channel estimation signal (EHT-CES) including the OFDM symbol for channel estimation between the AP and the STA. The OFDM frame may further comprise a data field and one of an EHT short training field (EHT-STF), or an EHT SIG field (EHT-SIG).

In some embodiments, the STA may transmit the OFDM frame in a signal. A second STA may transmit a second OFDM frame in the signal.

The OFDM symbol may comprise a first reference signal (RS) transmitted by the data tones and the pilot tones of the first set of allocated tones. The data tones and the pilot tones of the first set of allocated tones may be segmented into a plurality of blocks for channel estimation between the AP and the STA. The second OFDM frame may comprise a second OFDM symbol. A second OFDM symbol in the second OFDM frame may comprise a second RS transmitted by data tones and pilot tones of a second set of allocated tones. The data tones and the pilot tones of the second set of allocated tones may be segmented into a second plurality of blocks for channel estimation between the AP and the second STA, Each block of the plurality of blocks for transmitting the first RS may be orthogonal to a corresponding block of the second plurality of blocks. The first RS may be different from the second RS.

In some embodiments, the OFDM symbol may comprise a first reference signal (RS) transmitted by the 232 data tones and the 8 pilot tones of the first set of allocated tones. The 232 data tones and the 8 pilot tones of the first set of allocated tones may be segmented into a set of 15 blocks for channel estimation between the AP and the STA. The AP may receive the second OFDM frame. A second OFDM symbol of the second OFDM frame may comprise the second RS transmitted by 232 data tones and 8 pilot tones of the second set of allocated tones. The 232 data tones and the 8 pilot tones of the second set of allocated tones may be segmented into a second set of 15 blocks for channel estimation between the AP and the second STA, The number of tones in each block of the set of 15 blocks for transmitting the first RS and the second set of 15 blocks for transmitting the second RS may equal 16. Each block of the set of 15 blocks for transmitting the first RS may be orthogonal to a corresponding block of the second set of 15 blocks for transmitting the second RS. The first RS may be different from the second RS.

In one embodiment, each block of the set of 15 blocks for transmitting the first RS and the second set of 15 blocks for transmitting the second RS is one of a set of 16 orthogonal Hadamard codes.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure provide embodiments that allow WLAN systems, such as IEEE 802.11ax networks, to better adopt NoMA technologies, particularly the sparse code multiple access (SCMA) technology. NoMA improves the spectral efficiency of wireless radio access by enabling overloading (i.e., the number of multiplexed user devices can be larger than the number of resources). One example of NoMA is sparse code multiple access (SCMA). In SCMA, data is spread over multiple frequency tones resources of orthogonal frequency division multiple access (OFDMA) resources (or any other types of orthogonal resources or multi-carrier modulation) through multi-dimensional codewords. Sparsity of the codewords helps to reduce the complexity of joint detection of multiplexed SCMA layers by using message passing algorithm (MPA).

Orthogonal sequence generation is easier to perform when the sequences are generated in number of powers of 2 (e.g., 4, 8, and 16 . . . ). So, SCMA codebooks are often designed with codewords applied every 4 tones. In contrast, in the conventional 802.11ax numerology, the number of data tones is not divisible by 4. So, the conventional 802.11ax numerology is not well suited to adopt the SCMA technology. Disclosed herein are techniques for multiple access in WLANs with a new numerology. More specifically, aspects of this disclosure allow an access point to receive an orthogonal frequency division multiplexing (OFDM) frame transmitted by a station. The allocated tones for transmitting the symbols in the OFDM frame comprise data tones and pilot tones. The total number of the data tones and the pilot tones for transmitting the OFDM symbol is divisible by 4 to accommodate the SCMA technology for NoMA access in the WLAN systems such as an IEEE 802.11ax network. In so doing, the disclosed techniques improve resource utilization efficiency, latency reduction, signal overhead reduction, and performance enhancement of WLAN devices over the conventional systems.

Figure 1:
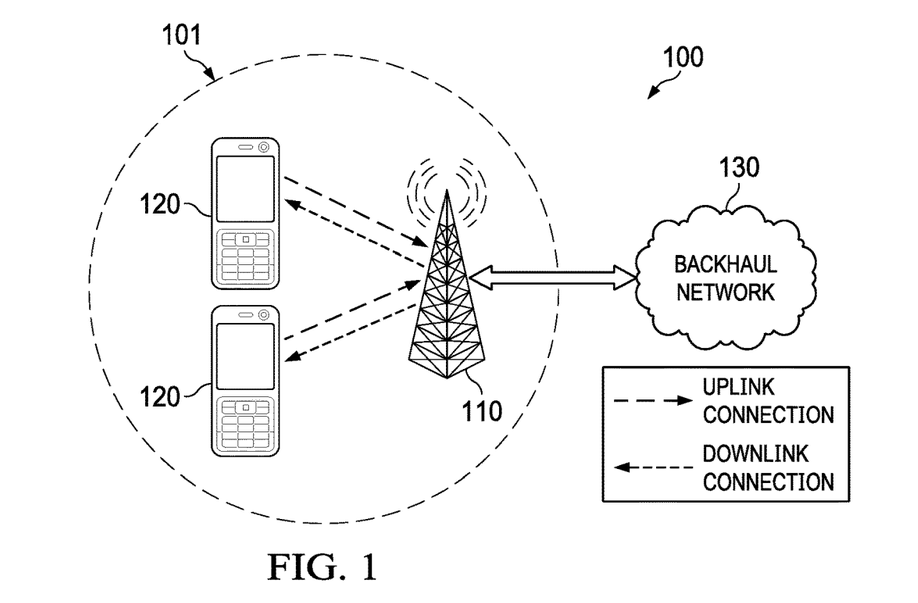
FIG. 1 illustrates a diagram of an embodiment wireless network.

FIG. 1 illustrates a wireless network 100 for communicating data. The wireless network 100 includes an access point (AP) 110 which has a coverage area 101, a plurality of mobile devices 120, and a backhaul network 130. The AP 110 may comprise any component capable of providing wireless access by, among other things, establishing uplink (dashed line) and/or downlink (dotted line) connections with the mobile devices 120. For instance, the AP 110 may be a base station, an enhanced base station (eNB), a femtocell, a Wi-Fi AP, and other devices capable of providing wireless access to the mobile devices 120. The mobile devices 120 may comprise any component capable of establishing a wireless connection with the AP 110, such as a mobile station (STA), a user equipment (UE), or other wirelessly enabled devices. The backhaul network 130 may be any component or collection of components that allow data to be exchanged between the AP 110 and a remote end. In some embodiments, there may be multiple such networks, and/or the network may comprise various other wireless devices, such as relays, low power nodes, etc.

Figure 2A:
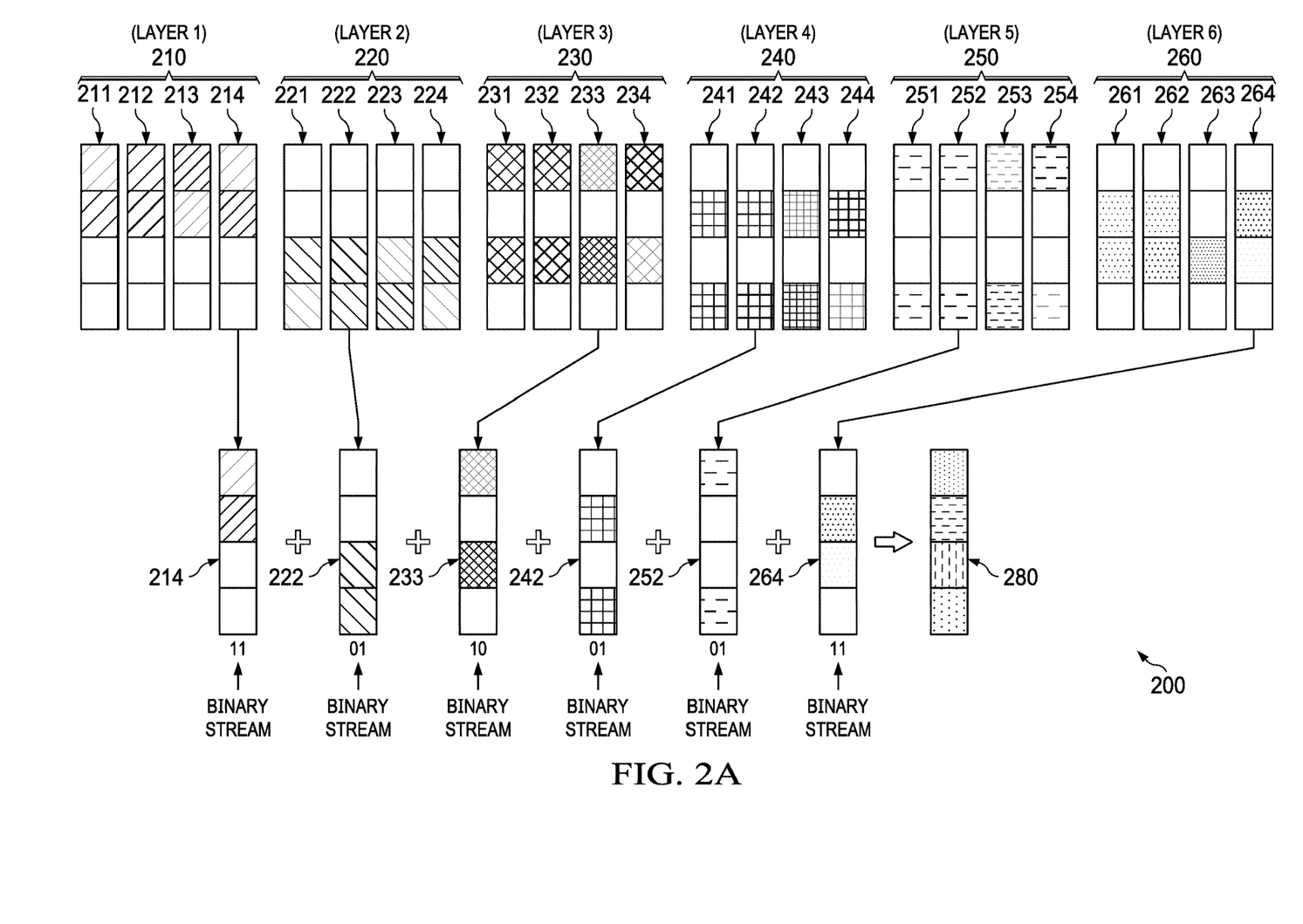
FIG. 2A illustrates an example SCMA multiplexing scheme for encoding data according to example embodiments described herein.

FIG. 2A illustrates an example SCMA multiplexing scheme 200 for encoding data. As shown in FIG. 2A, SCMA multiplexing scheme 200 may utilize a plurality of codebooks, such as codebook 210, codebook 220, codebook 230, codebook 240, codebook 250, and codebook 260. Each codebook of the plurality of codebooks is assigned to a different multiplexed layer. Each codebook includes a plurality of multidimensional codewords. More specifically, codebook 210 includes codewords 211-214, codebook 220 includes codewords 221-224, codebook 230 includes codewords 231-234, codebook 240 includes codewords 241-244, codebook 250 includes codewords 251-254, and codebook 260 includes codewords 261-264.

Each codeword of a respective codebook may be mapped to a different data, e.g., binary, value. As an illustrative example, codewords 211, 221, 231, 241, 251, and 261 are mapped to binary value '00', the codewords 212, 222, 232, 242, 252, and 262 are mapped to the binary value '01', the codewords 213, 223, 233, 243, 253, and 263 are mapped to the binary value '10', and the codewords 214, 224, 234, 244, 254, and 264 are mapped to the binary value '11'. It is noted that although the codebooks in FIG. 2 are depicted as having four codewords each, SCMA codebooks in general may have any number of codewords. As an example, SCMA codebooks may have 8 codewords (e.g., mapped to binary values '000' . . . '111'), 16 codewords (e.g., mapped to binary values '0000' . . . '1111'), or more.

As shown in FIG. 2A, different codewords are selected from various codebooks 210, 220, 230, 240, 250, and 260 depending on the binary data being transmitted over the multiplexed layers. In this example, codeword 214 is selected from codebook 210 because the binary value '11' is being transmitted over the first multiplexed layer, codeword 222 is selected from codebook 220 because the binary value '01' is being transmitted over the second multiplexed layer, codeword 233 is selected from codebook 230 because the binary value '10' is being transmitted over the third multiplexed layer, codeword 242 is selected from codebook 240 because the binary value '01' is being transmitted over the fourth multiplexed layer, codeword 252 is selected from codebook 250 because the binary value '01' is being transmitted over the fifth multiplexed layer, and codeword 264 is selected from codebook 260 because the binary value '11' is being transmitted over the sixth multiplexed layer. Codewords 214, 222, 233, 242, 252, and 264 may then be multiplexed together to form multiplexed data stream 280, which is transmitted over shared resources of a network. Combination of layers may happen either at a transmit device (as in DL) or over the air (as in UL) or both (as in DL CoMP). Notably, codewords 214, 222, 233, 242, 252, and 264 are sparse codewords, and therefore can be identified upon reception of multiplexed data stream 280 using a low complexity algorithm, such as a message passing algorithm (MPA).

In summary the SCMA multiplexing enables non-orthogonal multiple access with enhanced spectrum efficiency, lower latency, lower signaling overhead, and the like. The SCMA waveform also supports overloading where data for multiple user devices are combined to increase overall data rate and connectivity. The sparsity present in SCMA codewords limits detection complexity. Multi-dimensional codewords allow for shaping gain and better spectral efficiency with spreading for robust link-adaptation.

Figure 2B:
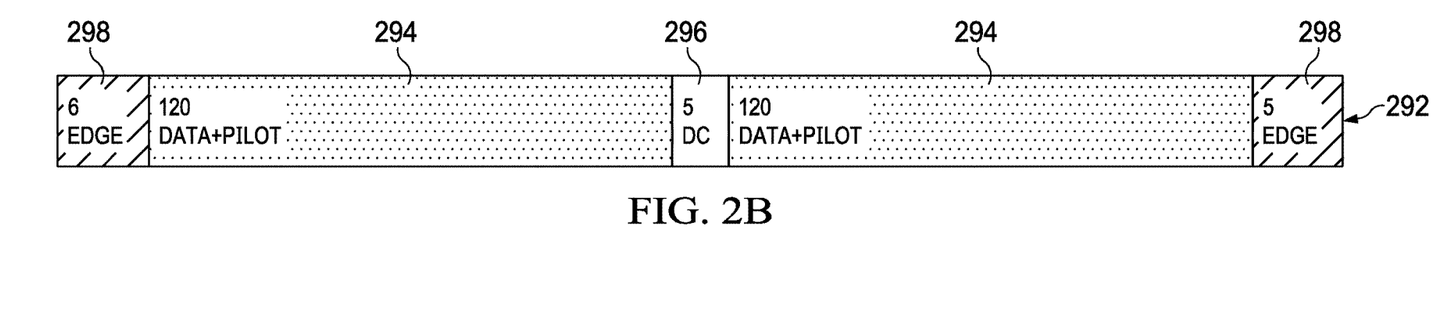
FIG. 2B shows an example tone allocation for an OFDM frame, according to some embodiments.

There are technical challenges in adopting the SCMA technology in the current WLAN systems. The current IEEE 11ax 20 MHz payload portion OFDM numerology for single user physical layer convergence protocol data unit (SU-PPDU) is 234 data tones, 8 pilot tones, 3 direct current (DC) tones, and 11 edge tones. The 234 data tones are not divisible by 4. However, SCMA codebooks are often designed with codewords applied every 4 tones for easier orthogonal sequence generation. To solve this technical problem and better accommodate the SCMA codebook design, embodiments of this disclosure provide a new OFDM numerology such that the number of the data tones is divisible by 4. In addition, because the data tones and the pilot tones are required for channel estimation, the total number of the data tones and the pilot tones is also divisible by 4. In some embodiments, allocated tones for transmitting an OFDM symbol based on the new numerology comprise 256 tones including 232 data tones, 8 pilot tones, 5 DC tones, and 11 edge tones, as shown in FIG. 2B. FIG. 2B illustrates a non-limiting example tone allocation 292 for transmitting an OFDM symbol. In the tone allocation 292, there may be a total of 240 data tones and pilot tones (blocks 294). In some embodiments, the 240 tones include 232 data tones and 8 pilot tones. There are also 5 DC tones (block 296) and 11 edge tones (blocks 298) in the tone allocation 292. In essence, as compared to an OFDM frame in the conventional (e.g., IEEE 802.11ax) numerology, the number of data tones is decreased by 2 to 232, and the number of DC tones is increased by 2 to 5 in the new design of the numerology for the SCMA based OFDM frames for better adoption of the NoMA (e.g., SCMA) technology in WLAN systems. FIG. 2B provides a non-limiting example of tone allocation. Other tone allocation may also be utilized, such as the ones where the total number of the data tones and the pilot tones is divisible by powers of 2 (e.g., 8, and 16 . . . ).

Figure 3:
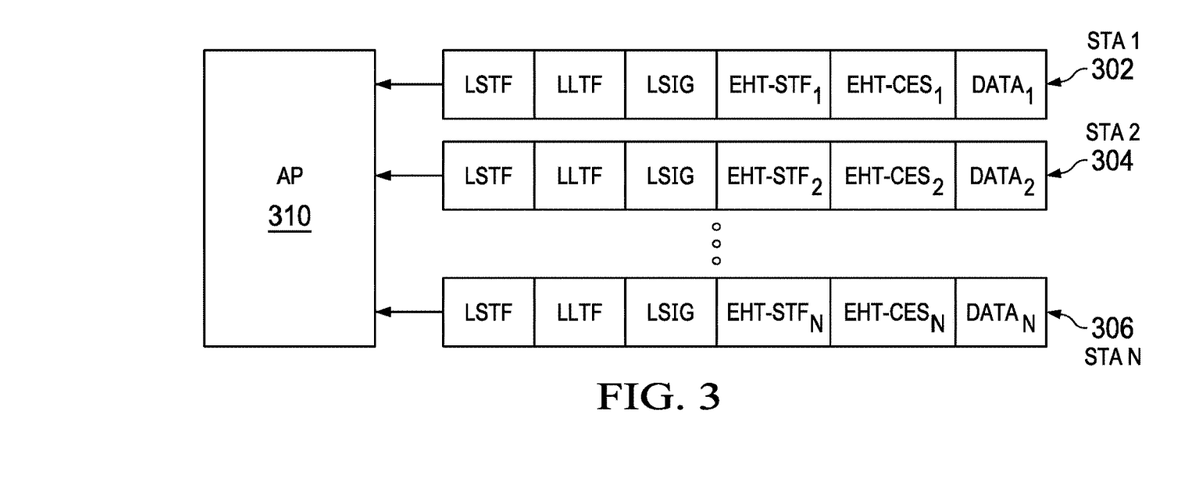
FIG. 3 illustrates the basic operations of using SCMA based frames for grant-free uplink (UL) transmissions from multiple STAs to an AP, according to some embodiments.

FIG. 3 shows the basic operations of using SCMA based frames for grant-free uplink (UL) transmissions from multiple STAs to the AP, according to some embodiments. After the AP 310 sends a trigger frame for the grant-free UL access, indicating that the STAs served by the AP 310 may transmit the SCMA based frames using the grant-free resources as shown in FIG. 3. As shown in FIG. 3, the STA 1 may transmit the frame 302 to the AP 310, the STA 2 may transmit the frame 304 to the AP 310, . . . , and the STA N may transmit the frame 306 to the AP 310. FIG. 3 shows 3 frames 302, 304, and 306 from 3 STAs for illustration purpose. Any number of STAs may be supported.

Each STA transmits the identical legacy short training field (LSTF), legacy long training field (LLTF), and legacy signal field (LSIG) to protect the medium. Each STA may transmit its own different Extreme High Throughput (EHT) short training field (EHT-STF), EHT channel estimation signal (EHT-CES), and data field. The purpose of the EFIT-STF is to re-adjust the automatic gain control (AGC) of each frame at the AP 310 side, even though the initial AGC is completed with LSTF. In case the AGC re-adjustment is unnecessary, the EHT-STF can be omitted from the frame format. That is, the SCMA based frame starts with the LSTF followed by the LLTF, the LSIG, the EHT-CES, and the data field in this case. This disclosure focuses on the EHT-CES design which may be used for the channel estimation between the AP 310 and each STA. The EHT-CES may comprise an OFDM symbol for channel estimation.

Figure 4:
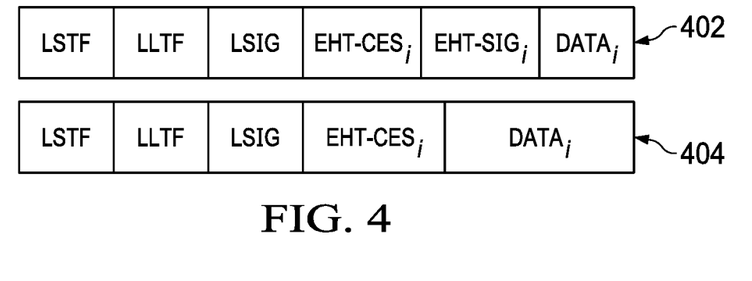
FIG. 4 illustrates additional alternative SCMA based frame formats, according to some embodiments.

FIG. 4 shows other alternative SCMA based frame formats, according to some embodiments. In FIG. 4, the EHT-STF for the AGC re-adjustment may not be necessary for frames 402 and 404. For frame 402, the EHT SIG field (EHT-SIG$_i$) carries the control signaling for the i-th station STA$_i$ such as the basic service set (BSS) color, the transmit opportunity (TROP), the cyclic redundancy check (CRC), and the tail etc. The control signal information can be carried in the media access control (MAC) header of the data field such that the CRC and the tail bits do not have to be in the control signaling. The CRC can be checked by the frame check sequence (FCS) at the end of the packet in this case. For frame 404, the EHT-SIG may be omitted.

Figure 5:
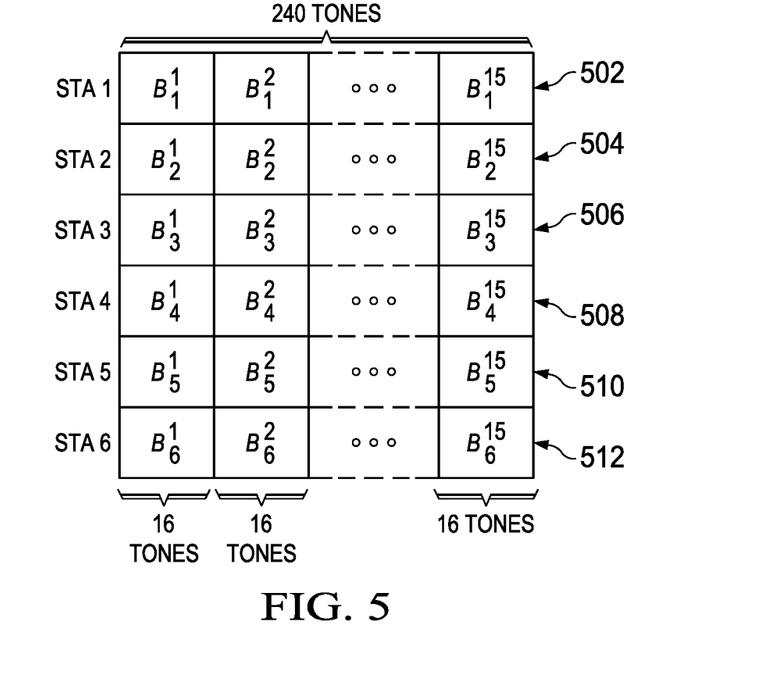
FIG. 5 shows an example technique for segment based reference signal (RS), according to some embodiments.

The frames in FIGS. 3 and 4 includes the EHT-CES$_i$, which represents the EHT-CES of the i-th station STA i. The EHT-CES$_i$ can be a unique identification of STA i, as well. That means EHT-CES, of STA i may be unique and different from the EHT-CES for another STA. In addition, the EHT-CES may comprise an OFDM symbol for channel estimation. More specifically, the data tones and the pilot tones for transmitting the OFDM symbol of the EHT-CES may be required for the reference signal (RS) for the channel estimation. In some embodiments where the channel estimation requires the RS to be transmitted by 240 tones (e.g., 232 data tones and 8 pilot tones), the disclosed techniques may segment these 240 tones for transmitting the OFDM symbol into 15 blocks, and each block includes 16 tones. Furthermore, each block for one STA needs to be orthogonal to the corresponding blocks of other STAs served by the AP. For example, the first block for each of STA 1, STA 2, STA 3, STA 4, STA 5, and STA 6 needs to be orthogonal to one another. FIG. 5 illustrates an example technique for segment based reference signal (RS), according to some embodiments.

FIG. 5 shows 6 stations, STAs 1-6, that access an AP. The number of STAs for GF concurrent UL transmissions is 6. The 6 STAs in FIG. 5 are purely for illustration purpose. Any number of STAB up to 16 STAs may be supported based on the disclosed segmentation technique for segment based RS, because there are 16 orthogonal sequences with the 16 tone long sequence. The length of the sequence may be variable as well. For example, if the 8 tone long sequence is used to generate the orthogonal sequences, up to 8 STAs can be supported by the design. However, in this case, there may be 30 segmentations per 240 tone OFDM symbol. Each STA transmits an EHT-CES with 240 tones (e.g., 232 data tones and 8 pilot tones) in its SCMA based frame, such as the frames described with respect to FIGS. 3 and 4. A 240-tone sequence for transmitting the RS is segmented into 15 blocks with 16 tones in each block. In FIG. 5, each block is represented by B$_i^k$, where i represents the STA index and k represents the block index. For example, the RS for the STA 1 is segmented into 15 blocks $B_1^1$-$B_1^{15}$, with $B_1^1$ being the first block and $B_1^{15}$ being the last block of the RS for the STA 1. Similarly, the RS for the STA 2 is segmented into 15 blocks $B_2^1$-$B_2^{15}$, the RS for the STA 3 is segmented into 15 blocks $B_3^1$-$B_3^{15}$, the RS for the STA 4 is segmented into 15 blocks $B_4^1$-$B_4^{15}$, the RS for the STA 5 is segmented into 15 blocks $B_5^1$-$B_5^{15}$, and the RS for the STA 6 is segmented into 15 blocks $B_6^1$-$B_6^{15}$. Here, each block for a STA needs to be orthogonal to the block at the corresponding position (i.e., the same block index) for another STA. That is, $B_i^k \perp B_j^k$, which means that the k-th block for STA i and the k-th block for STA j are orthogonal to each other.

The RS for a STA may need to be unique when the EHT-CES for the STA also functions as a unique identifier for the STA. That means, in some embodiments with respect to FIG. 5, $B_1^1$-$B_1^{15}$ for the STA 1, $B_2^1$-$B_2^{15}$ for the STA 2, $B_3^1$-$B_3^{15}$ for STA 3, $B_4^1$-$B_4^{15}$ for the STA 4, $B_5^1$-$B_5^{15}$ for the STA 5, and $B_6^1$-$B_6^{15}$ for the STA 6 are unique and different from each other.

The received signal for the k-th block ($Y^k$) may be expressed as the following equation.

$$Y^k = \sum_{i=1}^{N} h_i B_i^k + n$$

Here, $h_i$ is the channel between AP and STA$_i$, and $B_i^k$ is the block sequence for the k-th block of STA$_i$. Then, the channel $h_i$ may be obtained by obtaining all of the $h_i^k$ based on the following equation. N is the number of STAs that have transmitted.

$$h_i^k = (B_i^k)^H Y^k / N$$

Figure 6:
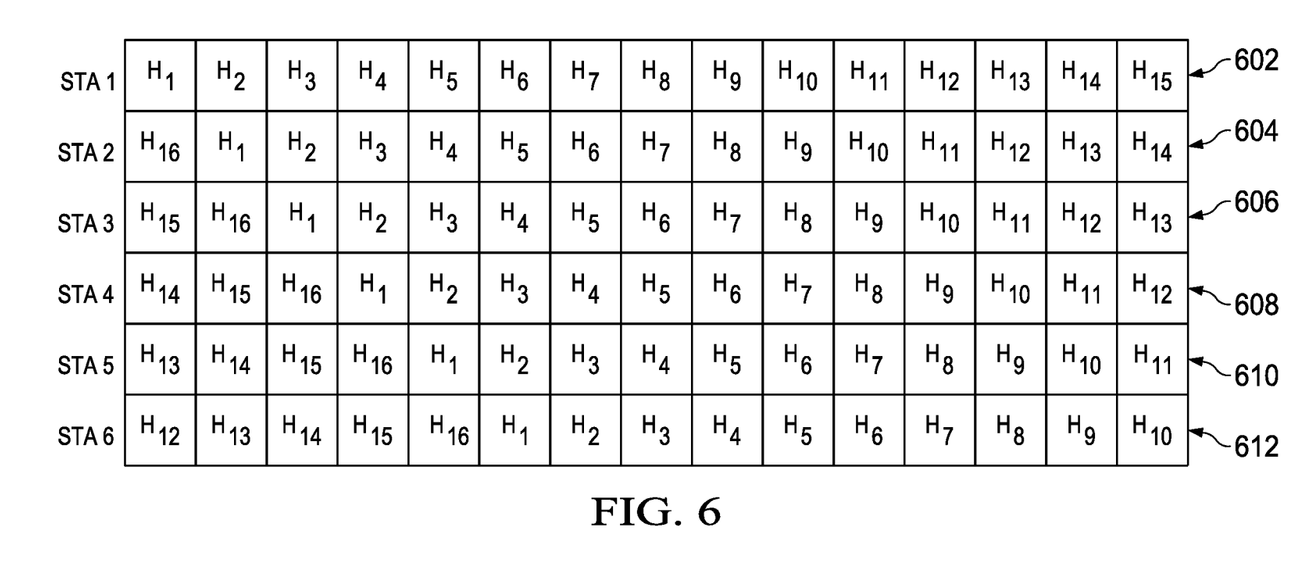
FIG. 6 depicts an embodiment assignment of Hadamard codes to blocks of 6 STAs, according to some embodiments.

In some embodiments, the Hadamard codes may be used to generate the RS transmitted on the 240 tones. The Hadamard coding technique with 16-sequence may generate 16 orthogonal Hadamard codes: $H_1$, $H_2$ ..., and $H_{16}$. FIG. 6 illustrates an embodiment assignment of Hadamard codes to blocks of 6 STAs. The 6 STAs in FIG. 6 are for illustration purpose. Any number of STAs up to 16 may be supported based on the technique disclosed herein. As FIG. 6 shows, the first 15 Hadamard codes ($H_1$-$H_{15}$) may be assigned to the 15 blocks of the RS 602 of the STA 1. For the STA 2, the 16th Hadamard codes ($H_{16}$) may be assigned to the first block followed by the first 14 Hadamard codes ($H_1$-$H_{14}$) to form the RS 604. For the STA 3, the 15th and the 16th Hadamard codes ($H_{15}$-$H_{16}$) may be assigned to the first two blocks followed by the first 13 Hadamard codes ($H_1$-$H_{13}$) to form the RS 606. For the STA 4, the 14th to the 16th Hadamard codes ($H_{14}$-$H_{16}$) may be assigned to the first three blocks followed by the first 12 Hadamard codes ($H_1$-$H_{12}$) to form the RS 608. For the STA 5, the 13th to the 16th Hadamard codes ($H_{14}$-$H_{16}$) may be assigned to the first four blocks followed by the first 11 Hadamard codes ($H_1$-$H_{11}$) to form the RS 610. For the STA 6, the 12th to the 16th Hadamard codes ($H_{12}$-$H_{16}$) may be assigned to the first five blocks followed by the first 10 Hadamard codes ($H_1$-$H_{10}$) to form the RS 612.

In so doing, the embodiment assignment of Hadamard codes in FIG. 6 allows each of the RSs 602, 604, 606, 608, 610, and 612 to be unique and different from each other. In addition, a block for a STA is orthogonal to a block with same block index at the corresponding position for another STA. For example, the first block for each of STAs 1-6 are $H_1$, $H_{16}$, $H_{15}$, $H_{14}$, $H_{13}$, and $H_{12}$, respectively, and each of $H_1$, $H_{16}$, $H_{15}$, $H_{14}$, $H_{13}$, and $H_{12}$ are orthogonal to each other. Thus, the unique channel estimation for each STA for each block can be achieved. In order to obtain the channel parameters for each subcarrier, an extra smoothing process may be needed for the estimated channel as above, such as Wiener filtering or interpolation, etc.

Figure 7:
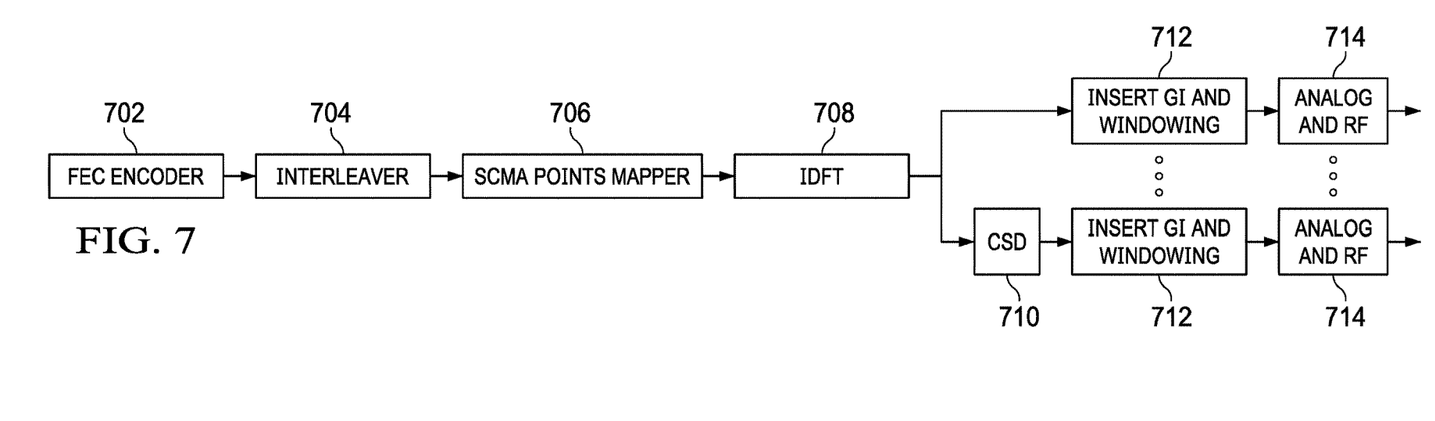
FIG. 7 illustrates an example transmitter flow at a STA, according to some embodiments.

FIG. 7 depicts an example transmitter flow at a STA, according to some embodiments. At block 702, data bits to be transmitted by the STA are provided to the forward error correction (FEC) encoder to produce encoded data bits. The FEC encoder may be implemented using a convolutional encoder, a turbo encoder, or a low-density parity-check (LDPC) encoder, for example. At block 704, the interleaver may re-arrange the encoded data bits to produce interleaved data bits for frequency diversity. At block 706, the interleaved data bits are provided to an SCMA points mapper to produce SCMA codewords. At block 708, an inverse discrete Fourier transform (IDFT) unit transforms the SCMA codewords in the time domain into encoded data symbols in the frequency domain. At block 712, the guard intervals are inserted into the encoded data symbols, and windowing is applied to smooth the edges of each symbol to increase spectral decay. At block 714, the symbols are converted into the analog radio frequency (RF) signal for transmission. Alternatively, cyclic shift diversity (CSD) may be applied at block 710 before the guard interval (GI) insertion and the windowing at block 712.

Figure 8:
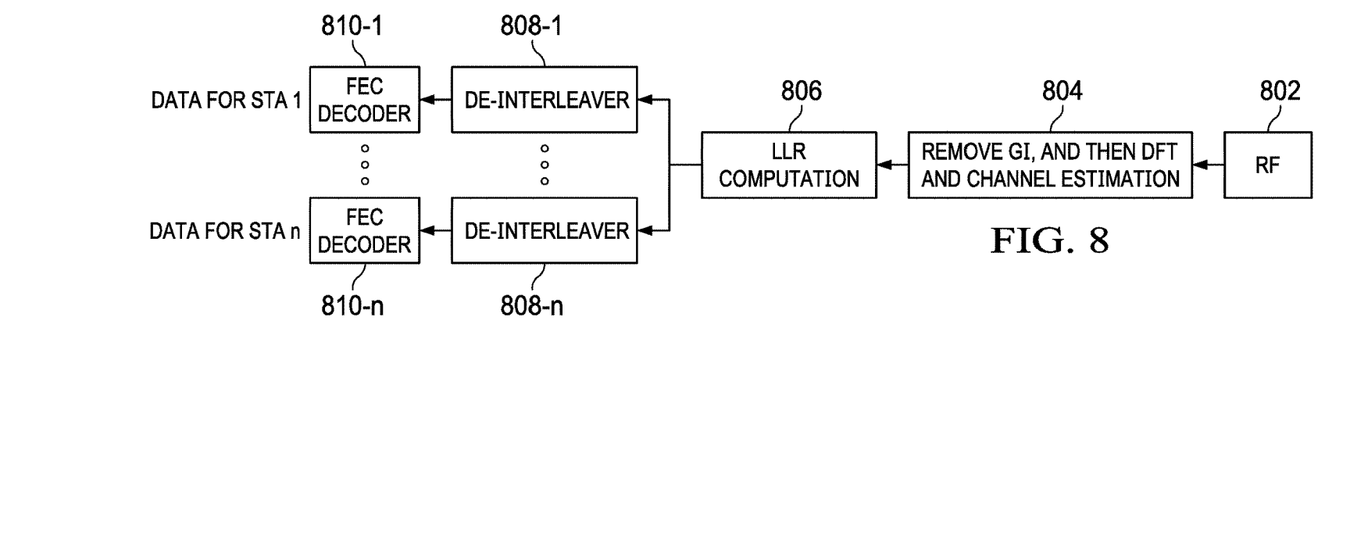
FIG. 8 illustrates an example receiver flow at the AP, according to some embodiments.

FIG. 8 depicts an example receiver flow at the AP, according to some embodiments. At block 802, the receiver receives an RF signal containing data transmitted by multiple stations (e.g., STAs 1-$n$). At block 804, the receiver removes the GIs, applies discrete Fourier transform (DFT), and performs channel estimation. At block 806, the receiver performs log-likelihood ratio (LLR) computation. The details of the LLR computation are described below. Based on the result of the LLR computation, data transmitted from each STA is separately processed. At block 808-1, data from STA 1 is de-interleaved. At block 810-1, the de-interleaved data from STA 1 is decoded by the FEC decoder to generate the data bits from STA 1. Similarly, at block 808-$n$, data from STA n is de-interleaved. At block 810-$n$, the de-interleaved data from STA n is decoded by the FEC decoder to generate the data bits from STA n.

The LLR computation at block 806 may be maximum likelihood (ML) based LLR calculation for the SCMA packets. The LLRs for each tone of each STA are obtained by taking a logarithm of a sum over multiple exponentials. So, the sum of the exponentials can be approximated by finding a maximum exponent value of exponentials (Max-Log approximation), which can be given as below.

$$L(x^q|y, H_{\tilde{s}}) = \log \frac{\sum_{\tilde{x} \in x_1^q} \sum_{\tilde{s} \in S} \exp\left(-\frac{\|y - H_{\tilde{s}}\tilde{x}\|^2}{2\sigma^2}\right)}{\sum_{\tilde{x} \in x_0^q} \sum_{\tilde{s} \in S} \exp\left(-\frac{\|y - H_{\tilde{s}}\tilde{x}\|^2}{2\sigma^2}\right)}$$

Here, $L(x^q|y, H_{\tilde{s}})$ is the LLR for the q-th bit of the corresponding STA and the corresponding 4-tone block when the received signal is a vector, y across the corresponding the 4-tone block. $H_{\tilde{s}}$ is the channel matrix for each tone of the corresponding 4-tone block. The elements of the channel matrix are the channel parameters between the AP and all 6 STAs. $\tilde{s}$ is each tone of the 4-tone block. S is the 4-tone block. $\tilde{x}$ is the codebook.

By the Max-Log approximation, the above equation for LLR computation may be approximated to the following.

$$L(x^q|y, H_{\tilde{s}}) = -\min_{\tilde{s} \in S, \tilde{x} \in x_1^q}\left\{\frac{1}{2\sigma^2}\|y - H_{\tilde{s}}\tilde{x}\|^2\right\} + \min_{\tilde{s} \in S, \tilde{x} \in x_0^q}\left\{\frac{1}{2\sigma^2}\|y - H_{\tilde{s}}\tilde{x}\|^2\right\}$$

The Euclidean distance between the received signal (y) and each STA's codebook may be computed. The corresponding bit is 1 or 0 with the Euclidean distances between the received signal (y) and all other STAs' codebooks, which will be repeated across all 4-tone blocks and added to each other. The minimum Euclidean distance with all combinations of the codebooks and 4-tone blocks will be selected as the likelihood for bit 1 or 0 per corresponding bit and for each STA. By subtracting the log-likelihood for bit 1 by the log-likelihood for bit 0, the LLR for each STA for each bit of each codeword could be computed.

Figure 9:
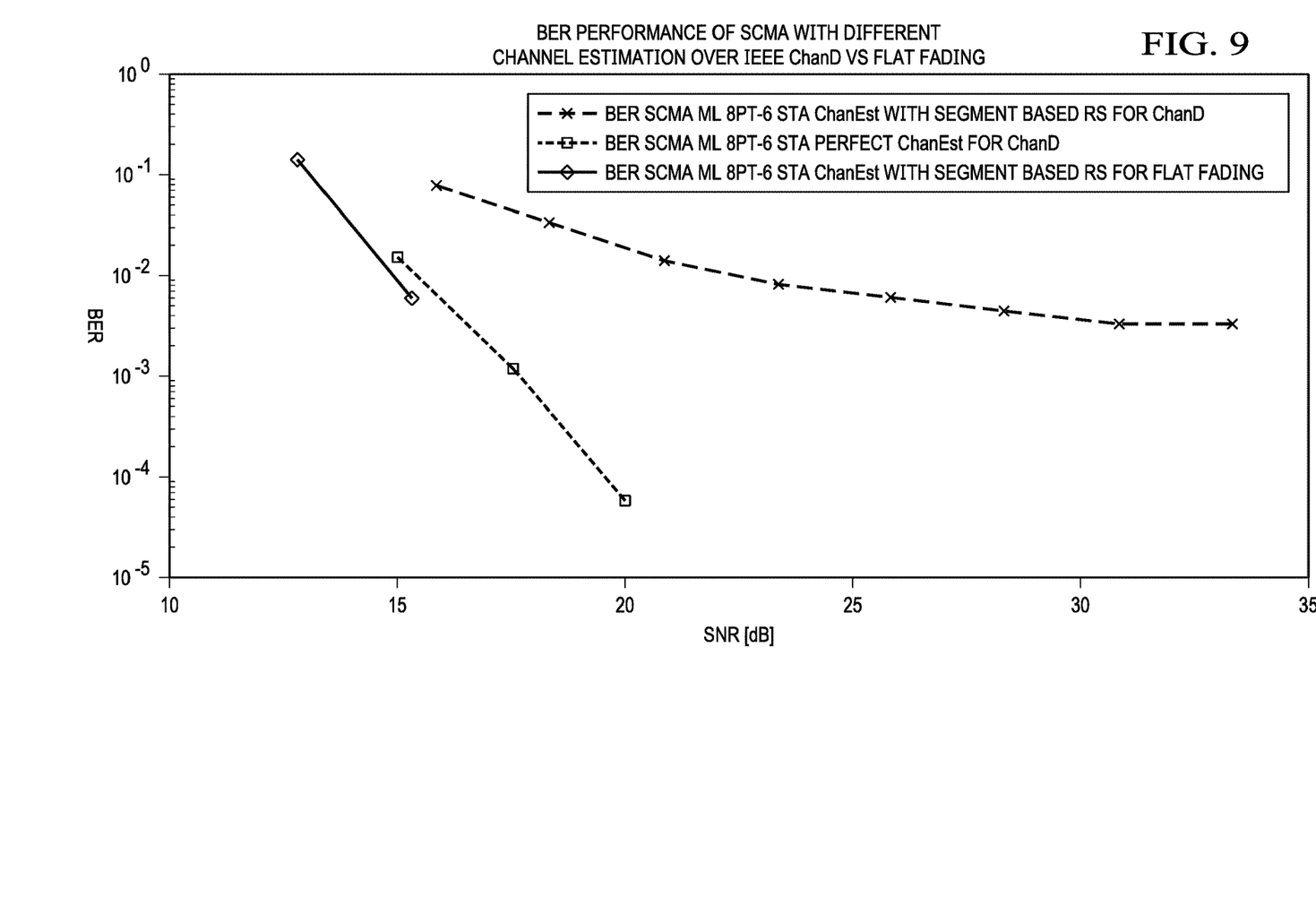
FIG. 9 illustrates the BER performance of SCMA with different channel estimation over IEEE channel D and flat fading.

FIG. 9 shows the BER performance of SCMA with different channel estimation over IEEE channel D and flat fading. The detection algorithm is based on the ML based LLR computation as described above, and the RS for the channel estimation is designed according to the segment based RS design technique, such as the one described with respect to FIG. 5.

The codebook design may follow the SCMA codebook design known in the art. In one example, the codebook with 8 points over the 4-tone projection is used for 6 STAs. That is, there are 8 different point symbols which can be regarded as the constellation (modulation) symbols, but they may be mapped to 4 tones for the OFDM transmission which provides the spreading. There may be 6 different sets of such codes.

Figure 10:
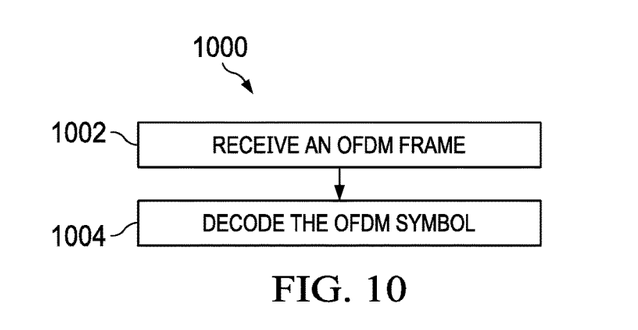
FIG. 10 shows a flowchart of a method for data communication by an access point (AP) in a non-orthogonal multiple access (NoMA) wireless network, according to some embodiments.

FIG. 10 illustrates a flowchart of a method 1000 for data communication by an access point (AP) in a wireless network that supports non-orthogonal multiple access (NoMA), according to some embodiments. The NoMA wireless network may be a WLAN. The method 1000 may be carried out or performed by a receiver of the AP, such as the AP 110 in FIG. 1. The method 1000 may also be carried out or performed by routines, subroutines, or modules of software executed by one or more processors of the AP. Coding of the software for carrying out or performing method 1000 is well within the scope of a person of ordinary skill in the art having regard to the present disclosure. The method may include additional or fewer operations than those shown and described and may be carried out or performed in a different order. Computer-readable code or instructions of the software executable by the one or more processor of the AP may be stored on a non-transitory computer-readable medium, such as for example, memory of the AP.

The method 1000 begins at the operation 1002, where the AP receives, from a station (STA), an orthogonal frequency division multiplexing (OFDM) frame. A first set of allocated tones for transmitting an OFDM symbol in the OFDM frame comprises data tones and pilot tones. The total number of the data tones and the pilot tones in the OFDM symbol is divisible by 4. In some embodiments, the total number of the data tones and the pilot tones in the OFDM symbol is divisible by 16. In some embodiments, the first set of allocated tones may comprise 232 data tones and 8 pilot tones. The allocated tones may further comprise 5 direct current (DC) tones and 11 edge tones. The OFDM frame may comprise an Extreme High Throughput (EHT) channel estimation signal (EHT-CES) including the OFDM symbol for channel estimation between the AP and the STA. The OFDM frame may further comprise a data field and one of an Extreme High Throughput (EHT) short training field (EHT-STF), or an EHT SIG field (EHT-SIG).

The OFDM symbol may comprise a first reference signal (RS) transmitted by the data tones and the pilot tones of the first set of allocated tones. The data tones and the pilot tones of the first allocated tones may be segmented into a plurality of blocks for channel estimation between the AP and the STA.

At the operation 1004, the AP decodes the OFDM symbol using a codebook. The codewords of the codebook are applied every 4 or every multiple of 4 tones.

The AP may receive, from a second STA, a second OFDM frame. A second OFDM symbol in the second OFDM frame may comprise a second RS transmitted by data tones and pilot tones of a second set of allocated tones. The second set of allocated tones may be segmented into a second plurality of Hocks for channel estimation between the AP and the second STA. Each block of the plurality of blocks for transmitting the first RS may be orthogonal to a corresponding block of the second plurality of blocks for transmitting the second RS.

In some embodiments, the OFDM symbol may comprise a first reference signal (RS) transmitted by the 232 data tones and the 8 pilot tones of the first set of allocated tones. The 232 data tones and the 8 pilot tones of the first set of allocated tones may be segmented into a set of 15 blocks for channel estimation between the AP and the STA. The AP may receive the second OFDM frame. The second OFDM symbol in the second OFDM frame may comprise the second RS transmitted by 232 data tones and 8 pilot tones of a second set of allocated tones. The 232 data tones and the 8 pilot tones of the second set of allocated tones may be segmented into a second set of 15 blocks for channel estimation between the AP and the second STA. The number of tones in each block of the set of 15 blocks for transmitting the first RS and the second set of 15 blocks for transmitting the second RS may equal 16. Each block of the 15 blocks for transmitting the first RS may be orthogonal to a corresponding block of the second set of 15 blocks for transmitting the second RS. The first RS may be different from the second RS.

In one embodiment, each block of the set of 15 blocks transmitting the first RS and the second set of 15 blocks for transmitting the second RS may comprise a Hadamard code of a set of 16 orthogonal Hadamard codes.

Figure 11:
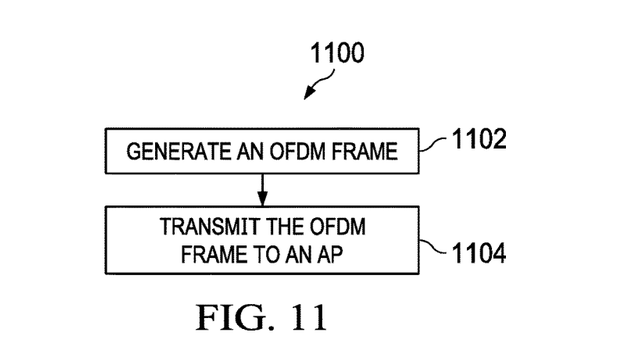
FIG. 11 shows a flowchart of a method for data communication by a station (STA) in a non-orthogonal multiple access (NoMA) wireless network, according to some embodiments.

FIG. 11 illustrates a flowchart of a method 1100 for data communication by a station (STA) in a wireless network that supports non-orthogonal multiple access (NoMA), according to some embodiments. The NoMA wireless network may be a WLAN. The method 1100 may be carried out or performed by a transmitter of the STA, such as the STA 120 in FIG. 1. The method 1100 may also be carried out or performed by routines, subroutines, or modules of software executed by one or more processors of the STA. Coding of the software for carrying out or performing method 1100 is well within the scope of a person of ordinary skill in the art having regard to the present disclosure. The method may include additional or fewer operations than those shown and described and may be carried out or performed in a different order. Computer-readable code or instructions of the software executable by the one or more processor of the STA may be stored on a non-transitory computer-readable medium, such as for example, memory of the STA.

The method 1100 starts at the operation 1102, where the STA generates an orthogonal frequency division multiplexing (OFDM) symbol in an OFDM frame based on a codebook. The codewords of the codebook are applied every 4 or every multiple of 4 tones. At the operation 1104, the STA transmits, to an access point (AP), the OFDM frame. A first set of allocated tones for transmitting an OFDM symbol in the OFDM frame may comprise data tones and pilot tones. The total number of the data tones and the pilot tones in the first set of allocated tones may be divisible by 4. In some embodiments, the total number of the data tones and the pilot tones in the first set of allocated tones is divisible by 16. In some embodiments, the first set of allocated tones may comprise 232 data tones and 8 pilot tones. The first set of allocated tones may further comprise 5 direct current (DC) tones and 11 edge tones. The OFDM frame may comprise an Extreme High Throughput (EHT) channel estimation signal (EHT-CES) including the OFDM symbol for channel estimation between the AP and the STA. The OFDM frame may further comprise a data field and one of an EHT short training field (EHT-STF), or an EHT SIG field (EHT-SIG).

In some embodiments, the STA may transmit the OFDM frame in a signal. A second STA may transmit a second OFDM frame in the signal.

The OFDM symbol may comprise a first reference signal (RS) transmitted by the data tones and the pilot tones of the first set of allocated tones. The data tones and the pilot tones of the first set of allocated tones may be segmented into a plurality of blocks for channel estimation between the AP and the STA. The second OFDM frame may comprise a second OFDM symbol. A second OFDM symbol in the second OFDM frame may comprise a second RS transmitted by data tones and pilot tones of a second set of allocated tones. The data tones and the pilot tones of the second set of allocated tones may be segmented into a second plurality of blocks for channel estimation between the AP and the second STA, Each block of the plurality of blocks for transmitting the first RS may be orthogonal to a corresponding block of the second plurality of blocks. The first RS may be different from the second RS.

In some embodiments, the OFDM symbol may comprise a first reference signal (RS) transmitted by the 232 data tones and the 8 pilot tones of the first set of allocated tones. The 232 data tones and the 8 pilot tones of the first set of allocated tones may be segmented into a set of 15 blocks for channel estimation between the AP and the STA. The AP may receive the second OFDM frame. A second OFDM symbol of the second OFDM frame may comprise the second RS transmitted by 232 data tones and 8 pilot tones of the second set of allocated tones. The 232 data tones and the 8 pilot tones of the second set of allocated tones may be segmented into a second set of 15 blocks for channel estimation between the AP and the second STA, The number of tones in each block of the set of 15 blocks for transmitting the first RS and the second set of 15 blocks for transmitting the second RS may equal 16. Each block of the set of 15 blocks for transmitting the first RS may be orthogonal to a corresponding block of the second set of 15 blocks for transmitting the second RS. The first RS may be different from the second RS.

In one embodiment, each block of the set of 15 blocks for transmitting the first RS and the second set of 15 blocks for transmitting the second RS is one of a set of 16 orthogonal Hadamard codes.

Figure 12:
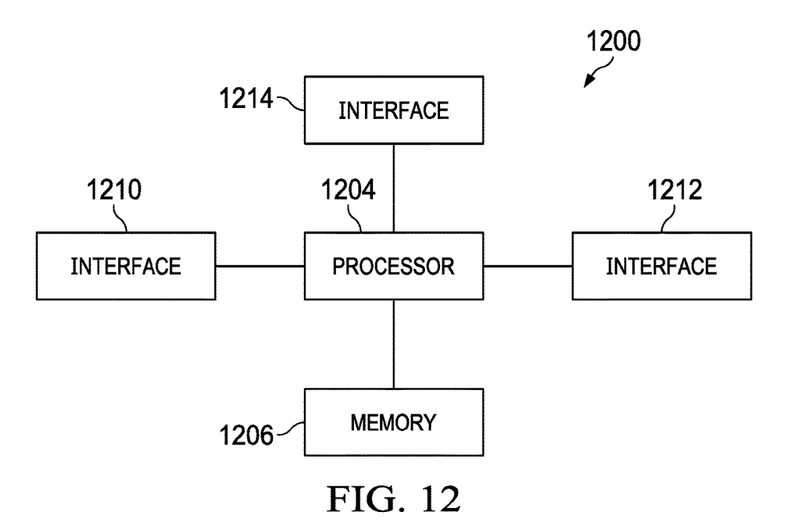
FIG. 12 illustrates a block diagram of an embodiment processing system.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station (STA), a user equipment (UE), a personal computer (PC), a tablet, a wearable communications device (e.g., a smartwatch, etc.), or any other device adapted to access a telecommunications network.

Figure 13:
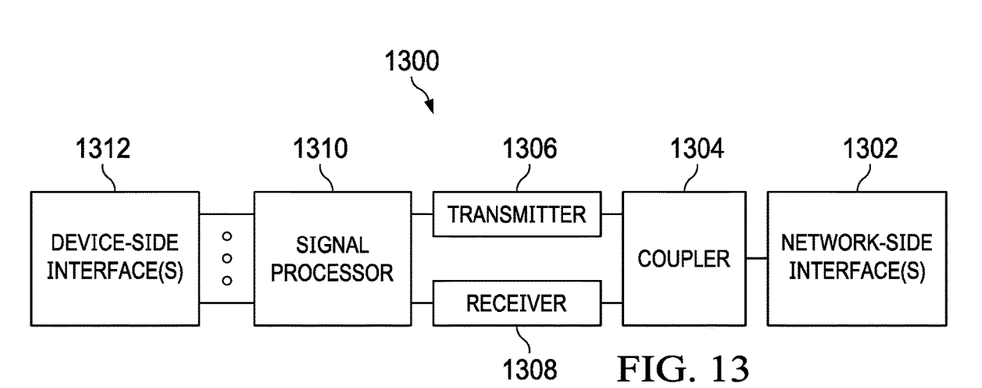
FIG. 13 illustrates a block diagram of an embodiment transceiver.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method for communicating data in a wireless network that supports non-orthogonal multiple access (NoMA), the method comprising:

receiving, by an access point (AP) from a station (STA), an orthogonal frequency division multiplexing (OFDM) frame, wherein a first set of allocated tones for transmitting an OFDM symbol in the OFDM frame comprise data tones and pilot tones, and a total number of the data tones and the pilot tones in the OFDM symbol is divisible by 4, the OFDM symbol comprising a first reference signal (RS) transmitted by the data tones and the pilot tones of the first set of allocated tones, the data tones and the pilot tones segmented into a plurality of blocks for channel estimation between the AP and the STA;

decoding, by the AP, the OFDM symbol using a codebook, wherein codewords of the codebook are applied every 4 or every multiple of 4 tones; and receiving, by the AP from a second STA, a second OFDM frame, a second OFDM symbol in the second OFDM frame comprising a second RS transmitted by data tones and pilot tones of a second set of allocated tones, the data tones and the pilot tones of the second set of allocated tones segmented into a second plurality of blocks for channel estimation between the AP and the second STA, wherein each block of the plurality of blocks for transmitting the first RS is orthogonal to a corresponding block of the second plurality of blocks for transmitting the second RS.

2. The method of claim 1, wherein the first set of allocated tones comprise 256 tones per 20 MHz, the 256 tones including 232 data tones and 8 pilot tones, 5 DC tones, and 11 edge tones.

3. The method of claim 1, wherein the OFDM frame comprises an Extreme High Throughput (EHT) channel estimation signal (EHT-CES) including the OFDM symbol for channel estimation between the AP and the STA.

4. The method of claim 3, wherein the OFDM frame further comprises a data field and one of an EHT short training field (EHT-STF), or an EHT signal field (EHT-SIG).

5. The method of claim 1, wherein the total number of the data tones and the pilot tones in the OFDM symbol is divisible by 16.

6. The method of claim 1, the first RS transmitted by 232 data tones and 8 pilot tones of the first set of allocated tones, the 232 data tones and the 8 pilot tones of the first set of allocated tones segmented into a first set of 15 blocks for channel estimation between the AP and the STA, the second RS transmitted by 232 data tones and 8 pilot tones of the second set of allocated tones, the 232 data tones and the 8 pilot tones of the second set of allocated tones segmented into a second set of 15 blocks for channel estimation between the AP and the second STA, wherein a number of tones in each block of the first set of 15 blocks for transmitting the first RS and the second set of 15 blocks for transmitting the second RS equals 16, each block of the first set of 15 blocks for transmitting the first RS is orthogonal to a corresponding block of the second set of 15 blocks for transmitting the second RS, and the first RS is different from the second RS.

7. The method of claim 6, wherein each block of the first set of 15 blocks for transmitting the first RS and the second set of 15 blocks for transmitting the second RS is one of a set of 16 orthogonal Hadamard codes.

8. The method of claim 1, wherein the first set of allocated tones further comprise a plurality of direct current (DC) tones between a first subset of the data tones and the pilot tones and a second subset of the data tones and the pilot tones, a first number of to in the first subset is divisible by 4, and a second number of tones in the second subset is divisible by 4.

9. A method for communicating data in a wireless network that supports non-orthogonal multiple access (NoMA), the method comprising:

generating, by a station (STA), an orthogonal frequency division multiplexing (OFOM) symbol in an OFDM frame based on a codebook, wherein codewords of the codebook are applied every 4 or every multiple of 4 tones; and transmitting, by the STA to an access point (AP), the OFDM frame, wherein a first set of allocated tones for transmitting the OFDM symbol in the OFDM frame comprise data tones and pilot tones, wherein a total number of the data tones and the pilot tones in the first set of allocated tones is divisible by 4, and wherein the STA transmits the OFDM frame in a signal with a second OFDM frame added in the signal, the second OFDM frame transmitted from a second STA, the OFOM symbol comprising a first reference signal (RS) transmitted by the data tones and the pilot tones of the first set of allocated tones, the data tones and the pilot tones of the first set of allocated tones segmented into a plurality of blocks for channel estimation between the AP and the STA, a second OFDM symbol in the second OFDM frame comprising a second RS transmitted by data tones and pilot tones of a second set of allocated tones, the data tones and the pilot tones of the second set of allocated tones segmented into a second plurality of blocks for channel estimation between the AP and the second STA, wherein each block of the plurality of blocks for transmitting the first RS is orthogonal to a corresponding block of the second plurality of blocks for transmitting the second PS.

10. The method of claim 9, wherein the first set of allocated tones comprise 256 tones per 20 MHz, the 256 tones including 232 data tones and 8 pilot tones, 5 DC tones, and 11 edge tones.

11. The method of claim 9, wherein the OFDM frame comprises an Extreme High Throughput (EHT) channel estimation signal (EHT-CES) including the OFDM symbol for channel estimation between the AP and the STA.

12. The method of claim 11, wherein the OFDM frame further comprises a data field and one of an EHT short training field (EHT-STF), or an EHT signal field (EHT-SIG).

13. The method of claim 9, the first RS transmitted by 232 data tones and 8 pilot tones of the first set of allocated tones, the 232 data tones and the 8 pilot tones of the first set of allocated tones segmented into a first set of 15 blocks for channel estimation between the AP and the STA, the second RS transmitted by 232 data tones and 8 pilot tones of the second set of allocated tones, the 232 data tones and the 8 pilot tones of the second set of allocated tones segmented into a second set of 15 blocks for channel estimation between the AP and the second STA, wherein a number of tones in each block of the first set of 15 blocks for transmitting the first RS and the second set of 15 blocks for transmitting the second RS equals 16, each block of the first set of 15 blocks for transmitting the first RS is orthogonal to a corresponding block of the second set of 15 blocks for transmitting the second RS, and the first RS is different from the second RS.

14. The method of claim 13, wherein each block of the first set of 15 blocks for transmitting the first RS and the second set of 15 blocks for transmitting the second RS comprises one of a set of 16 orthogonal Hadamard codes.

15. The method of claim 9, wherein the first set of allocated tones further comprise a plurality of direct current (DC) tones between a first subset of the data tones and the pilot tones and a second subset of the data tones and the pilot tones, a first number of tones in the first subset is divisible by 4, and a second number of tones in the second subset is divisible by 4.

16. An access point (AP) for communicating data in a wireless network that supports non-orthogonal multiple access (NoMA), the AP comprising:

a processor; and a non-transitory computer readable storage medium storing programming for execution by the processor, the programming including instructions to:

receive, from a station (STA), an orthogonal frequency division multiplexing (OFDM) frame, wherein a first set of allocated tones for transmitting an OFDM symbol in the OFDM frame comprise data tones and pilot tones, and a total number of the data tones and the pilot tones in the OFDM symbol is divisible by 4, the OFDM symbol comprising a first reference signal (RS) transmitted by the data tones and the pilot tones of the first set of allocated tones, the data tones and the pilot tones segmented into a plurality of blocks for channel estimation between the AP and the STA;

decode the OFDM symbol using a codebook, wherein codewords of the codebook are applied every 4 or every multiple of 4 tones; and receive, from a second STA, a second OFDM frame, a second OFDM symbol in the second OFDM frame comprising a second RS transmitted by data tones and pilot tones of a second set of allocated tones, the data tones and the pilot tones of the second set of allocated tones segmented into a second plurality of blocks for channel estimation between the AP and the second STA, wherein each block of the plurality of blocks for transmitting the first RS is orthogonal to a corresponding block of the second plurality of blocks for transmitting the second RS.

17. The AP of claim 16, wherein the first set of allocated tones comprise 256 tones per 20 MHz, the 256 tones including 232 data tones and 8 pilot tones, 5 DC tones, and 11 edge tones.

18. A station (STA) for communicating data in a wireless network that supports non-orthogonal multiple access (NoMA), the STA comprising:

a processor; and a non-transitory computer readable storage medium storing programming for execution by the processor, the programming including instructions to:

generate an orthogonal frequency division multiplexing (OFDM) symbol in an OFDM frame based on a codebook, wherein codewords of the codebook are applied every 4 or every multiple of 4 tones; and transmit, to an access point (AP), the OFDM frame, wherein a first set of allocated tones for transmitting the OFDM symbol comprise data tones and pilot tones, wherein a total number of the data tones and the pilot tones in the OFDM symbol is divisible by 4, and wherein the STA transmits the OFDM frame in a signal with a second OFDM frame added in the signal, the second OFDM frame transmitted from a second STA, the OFDM symbol comprising a first reference signal (RS) transmitted by the data tones and the pilot tones of the first set of allocated tones, the data tones and the pilot tones of the first set of allocated tones segmented into a plurality of blocks for channel estimation between the AP and the STA, a second OFDM symbol in the second OFDM frame comprising a second RS transmitted by data tones and pilot tones of a second set of allocated tones, the data tones and the pilot tones of the second set of allocated tones segmented into a second plurality of blocks for channel estimation between the AP and the second STA, wherein each block of the plurality of blocks for transmitting the first RS is orthogonal to a corresponding block of the second plurality of blocks for transmitting the second RS.

19. The STA of claim 18, wherein the first set of allocated tones comprise 256 tones per 20 MHz, the 256 tones including 232 data tones and 8 pilot tones, 5 DC tones, 11 edge tones.

* * * * *

UNITED STATES PATENT AND TRADEMARK OFFICE
CERTIFICATE OF CORRECTION

PATENT NO. : 10,862,637 B2
APPLICATION NO. : 16/184002
DATED : December 8, 2020
INVENTOR(S) : Jung Hoon Suh et al.

Page 1 of 1

It is certified that error appears in the above-identified patent and that said Letters Patent is hereby corrected as shown below:

In the Claims

In Column 15, Line 41, Claim 8, delete "number of to in the first subset" and insert --number of tones in the first subset--.

In Column 15, Line 48, Claim 9, delete "(OFOM)" and insert --(OFDM)--.

In Column 15, Line 61, Claim 9, delete "OFOM" and insert --OFDM--.

In Column 16, Line 8, Claim 9, delete "PS" and insert --RS--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*